United States Patent
Wang et al.

(10) Patent No.: US 12,093,019 B2
(45) Date of Patent: Sep. 17, 2024

(54) METHOD FOR CONSTRUCTING BODY-IN-WHITE SPOT WELDING DEFORMATION PREDICTION MODEL BASED ON GRAPH CONVOLUTIONAL NETWORK

(71) Applicant: Chongqing University, Chongqing (CN)

(72) Inventors: Shilong Wang, Chongqing (CN); Bo Yang, Chongqing (CN); Lili Yi, Chongqing (CN); Ling Kang, Chongqing (CN); Yu Wang, Chongqing (CN)

(73) Assignee: Chongqing University, Chongqing (CN)

( * ) Notice: Subject to any disclaimer, the term of this patent is extended or adjusted under 35 U.S.C. 154(b) by 302 days.

(21) Appl. No.: 17/830,361

(22) Filed: Jun. 2, 2022

(65) Prior Publication Data

US 2022/0390920 A1    Dec. 8, 2022

(30) Foreign Application Priority Data

Jun. 3, 2021  (CN) .......................... 202110617849.3

(51) Int. Cl.
  *A41H 3/00*     (2006.01)
  *B23K 31/00*    (2006.01)
  (Continued)

(52) U.S. Cl.
  CPC ........ *G05B 19/4099* (2013.01); *B23K 31/003* (2013.01); *G05B 2219/49007* (2013.01)

(58) Field of Classification Search
  CPC ...... G05B 19/4099; G05B 2219/49007; B23K 31/003
  See application file for complete search history.

(56) References Cited

U.S. PATENT DOCUMENTS

2019/0306526 A1* 10/2019 Cho ...................... G06N 3/047
2020/0401672 A1* 12/2020 Van der Velden ...... G06F 30/27

FOREIGN PATENT DOCUMENTS

CN      109175608 A     1/2019
CN      112102268 A    12/2020
(Continued)

OTHER PUBLICATIONS

Li Chunwei, et al., Object Detection Algorithm Based on Subcategory-Aware Deformable Part Models, Journal of Information Engineering University, 2017, pp. 646-651, vol. 18, No. 6.

*Primary Examiner* — Thomas C Lee
*Assistant Examiner* — Ameir Myers
(74) *Attorney, Agent, or Firm* — Bayramoglu Law Offices LLC

(57) ABSTRACT

A method for constructing a body-in-white (BiW) spot welding deformation prediction model based on a graph convolutional network (GCN) includes: 1) acquiring a welding feature and 3D coordinates of a spot weld to form an eigenvector and extracting designed 3D coordinates at each 3D coordinate measurement point; 2) encoding, by an encoder, eigenvectors and designed 3D coordinate vectors into hidden space vectors of spot welds and hidden space vectors of the coordinate measurement points, respectively, and constructing a graph topology G through a k-nearest neighbors algorithm; 3) decomposing a Laplacian eigenvector of the constructed graph topology G to acquire frequency domain components, and linearly transforming eigenvalues corresponding to the frequency domain components to construct a multi-layer GCN; 4) inputting the thermodynamic and kinetic information of each coordinate measurement point into a deep neural network and decoding a final deformation at each coordinate measurement point; and 5) optimizing the model.

2 Claims, 3 Drawing Sheets

(51) Int. Cl.
*G05B 19/4097* (2006.01)
*G05B 19/4099* (2006.01)

(56) References Cited

FOREIGN PATENT DOCUMENTS

| CN | 112560757 A | 3/2021 |
|----|-------------|--------|
| CN | 112651577 A | 4/2021 |

* cited by examiner

METHOD FOR CONSTRUCTING BODY-IN-WHITE SPOT WELDING DEFORMATION PREDICTION MODEL BASED ON GRAPH CONVOLUTIONAL NETWORK

CROSS REFERENCE TO THE RELATED APPLICATIONS

This application is based upon and claims priority to Chinese Patent Application No. 202110617849.3, filed on Jun. 3, 2021, the entire contents of which are incorporated herein by reference.

TECHNICAL FIELD

The present invention belongs to the technical field of welding, and in particular to a method for constructing a body-in-white (BiW) spot welding deformation prediction model based on a graph convolutional network (GCN).

BACKGROUND

The body-in-white (BiW) is a steel structure with supporting parts as the carrier, and is formed by welding hundreds of sheet metal parts. Spot welding, also known as electrical resistance welding, has become the most important welding method for connecting the sheet metal parts of the BiW because of its stability and easy automation. During spot welding, a large current of several hundred to tens of thousands of amperes is applied between two electrodes and the workpiece, and the interface of the workpiece is melted through the combined action of pressure and Joule heating to form a spot weld. The whole welding process involves very complex force and heat transfer, which has a significant effect on the deformation of the sheet material. A BiW has more than 5,000 spot welds with different process parameters and welding quality. These spot welds are intended to achieve the overall deformation of the BiW under the complex combined action, which brings great difficulty in the precision control of the BiW. The deformation mechanism of the BiW is unknown for a long time, and there is a lack of effective deformation prediction and control methods, such that car companies are hindered from improving production quality and reaping economic benefits.

At present, the automated production lines of Chinese automobile manufacturers are becoming increasingly developed. In recent years, with the rapid development of industrial big data (BD), massive data in the entire cycle of automobile production, including process parameters of spot welds and online coordinate measurement data for the deformation of the BiW, are acquired and stored conveniently and quickly. As massive data are acquired quickly, driven by the rapid development of current intelligent manufacturing and artificial intelligence (AI) technology, intelligent systems integrating BD-based intelligent diagnosis algorithms and intelligent decision-making predictions are expected to tap potential laws in massive manufacturing data. This brings a new opportunity to achieve predictive control of spot welding deformation accuracy of automobiles.

SUMMARY

In view of this, an objective of the present invention is to provide a method for constructing a body-in-white (BiW) spot welding deformation prediction model based on a graph convolutional network (GCN), so as to quickly predict a final deformation caused by spot welding in the production of a BiW.

In order to achieve the above objective, the present invention provides the following technical solution.

A method for constructing a BiW spot welding deformation prediction model based on a GCN includes the following steps:

1) acquiring each spot weld and a three-dimensional (3D) coordinate measurement point thereof of a BiW in a production process; extracting a welding feature and 3D coordinates of each spot weld $w_i$ to form an eigenvector $x_i$; and extracting designed 3D coordinates at the 3D coordinate measurement point;

2) inputting eigenvectors of all spot welds into a deep neural network (DNN) MLP_1, and encoding, by an encoder_1 of the DNN MLP_1, the eigenvectors into hidden space vectors of the spot welds; inputting designed 3D coordinate vectors of all 3D coordinate measurement points into a DNN MLP_2, and encoding, by an encoder_2 of the DNN MLP_2, the designed 3D coordinate vectors into hidden space vectors of the coordinate measurement points; and adding edges to the hidden space vectors of the spot welds and the hidden space vectors of the coordinate measurement points through a k-nearest neighbors (KNN) algorithm to construct a graph topology G;

3) decomposing a Laplacian eigenvector of the constructed graph topology G to acquire frequency domain components, and linearly transforming eigenvalues corresponding to the frequency domain components to construct a multi-layer GCN, where each layer of the GCN has a different frequency domain filter to adaptively extract thermodynamic and kinetic information in a neighborhood of each coordinate measurement point of the BiW;

4) inputting the thermodynamic and kinetic information of each coordinate measurement point into a DNN MLP_3; encoding, by an encoder of the DNN MLP_3, the thermodynamic and kinetic information into a 3D coordinate space, and decoding a final deformation at each coordinate measurement point; and outputting a predicted 3D vector of the deformation at each coordinate measurement point; and 5) optimizing the BiW spot welding deformation prediction model.

Further, in step 1), the welding feature may include:
a process signal's local peak, local valley, peak moment, valley-to-peak time, rise rate, end value, sag value, and sag rate, where the process signal may include a dynamic resistance, an electrode displacement, and an electrode pressure; and an acoustic emission signal's maximum vibration amplitude, event energy, ringing number, and rise time.

Further, step 2) specifically may include: inputting the eigenvectors $x_1 \sim x_m$ of all the spot welds into the DNN MLP_1, and encoding, by the encoder 1, the eigenvectors into the hidden space vectors $h_1 \sim h_m$ of the spot welds; and inputting the designed 3D coordinate vectors $p_1 \sim p_{n-m}$ of all the coordinate measurement points into the DNN MLP_2, and encoding, by the encoder_2, the designed 3D coordinate vectors into the hidden space vectors $h_{m+1} \sim k$ of the coordinate measurement points, where $h_1 \sim h_m$ and $h_{m+1} \sim h_n$ are located in a same vector space to form n discrete vectors $h_1 \sim h_n$;

adding, based on a metric space of a global coordinate system where $h_1 \sim h_n$ are located, edges to the vectors $h_1 \sim h_n$ through the KNN algorithm to construct the graph topology G=(H, E), where for an arbitrary i-th node, $h_i \in H$, H being a k-dimensional real vector space $R^k$, that is, $H \subseteq R^k$; and an edge connecting two nodes i and j is $e_{ij} \in E$, where E denotes an edge space of the graph topology G, $E \subseteq \{(x, y) | (x, y) \in H^2\}$, meaning an arbitrary pair of connected nodes in the graph topology.

Further, in step 3), the decomposing a Laplacian eigenvector of the constructed graph topology G may include:

31) constructing an adjacency matrix A of the graph topology G, where the adjacency matrix A is a 0-1 square matrix of n×n, and an element of the square matrix expresses whether two nodes are adjacent; if the two nodes i, j are adjacent, then $a_{ij}=1$; otherwise, $a_{ij}=0$; and $a_{ij}$ is an element of the adjacency matrix, that is, $a_{ij} \in A$;

32) constructing a symmetric normalized Laplacian matrix $L^{sys}$ of the graph topology G:

$$L^{sys} = D^{-1/2} L D^{-1/2}$$

where, D denotes a degree matrix of the graph topology G; and L denotes the Laplace matrix of the graph topology G;

$$L = D - A$$

33) subjecting the symmetric normalized Laplacian matrix $L^{sys}$ of the graph topology G to eigendecomposition (spectral decomposition):

$$L^{sys} = U \begin{pmatrix} \lambda_1 & & \\ & \ddots & \\ & & \lambda_n \end{pmatrix} U^{-1}$$

where, $U=(\vec{u}_1, \vec{u}_2, \cdots, \vec{u}_n)$; $\vec{u}_l$ denotes a column vector, which belongs to the vector space H, that is, $\vec{u}_l \in R^k$, l=1, 2, $\cdots$, n; and $$\Lambda = \begin{pmatrix} \lambda_1 & & \\ & \ddots & \\ & & \lambda_n \end{pmatrix}$$

denotes an eigenvalue matrix of the symmetric normalized Laplacian matrix $L^{sys}$; and $\lambda_1 \sim \lambda_n$ denote eigenvalues of the symmetric normalized Laplacian matrix $L^{sys}$ of the graph topology G.

Further, a method for constructing a graph convolutional layer based on the graph topology G may include: setting an i-th graph convolutional layer with an input feature $X_i$ and an output feature $X_{i+1}$, where $X \in R^{n \times k}$; $R^{n \times k}$ denotes a n×k-dimensional real matrix space; n denotes a number of graph nodes; and k denotes a dimension of the hidden space vector;

34) designing a set of filter parameters $g_\theta(\Lambda)$ for each channel of the input feature, which is a k-channel graph topology, and convolving each channel of the k-channel graph topology to acquire an eigenmatrix $\tilde{X}_i$:

$$g_\theta(\Lambda) = \begin{pmatrix} \hat{h}(\lambda_1) & & \\ & \ddots & \\ & & \hat{h}(\lambda_n) \end{pmatrix}$$

where, $\hat{h}(\lambda_1) \sim \hat{h}(\lambda_n)$ denote parameters of a graph filter; and $\hat{h}(\lambda_i)$ denotes a nonlinear function of $\lambda_i$, i={1, 2, . . . , n};

35) linearly transforming each channel in the eigenmatrix acquired by convolution to acquire an eigen transformation matrix $W \in R^{k \times k}$ and acquiring an output data $\lambda_{i+1}$ through an element-level nonlinear activation function ReLu:

$$X_{i+1} = ReLu\left(U \begin{pmatrix} \hat{h}(\lambda_1) & & \\ & \ddots & \\ & & \hat{h}(\lambda_n) \end{pmatrix} U^{-1} X_i\right)$$

where, $R^{k \times k}$ denotes a k×k-dimensional real matrix space.

Further, in step 3), the extracting thermodynamic and kinetic information in a neighborhood of each coordinate measurement point of the BiW may include:

36) connecting the constructed graph convolutional layer by a residual into a deep residual graph convolutional network (DRGCN), where the DRGCN includes L basic residuals, each of which forms the GCN by the graph convolutional layer; and outputting, by an L-th basic residual of the DRGCN, final thermodynamic and kinetic information on all the spot welds and coordinate measurement points of the BiW.

Further, in step 5), the optimizing the BiW spot welding deformation prediction model may include: processing, by a L2-norm loss function, actual and predicted 3D vectors of the deformation at each coordinate measurement point; and optimizing, by an adaptive movement estimation algorithm (Adam), L2-norm Loss_Avg of each coordinate measurement point as an optimization target to acquire the BiW spot welding deformation prediction model based on the GCN.

The present invention has the following beneficial effects:

In the present invention, the constructed BiW spot welding deformation prediction model based on the GCN can learn the thermodynamic and kinetic representation and propagation mode implied by the process parameter features of the spot welds on the BiW. The present invention enables rapid prediction of BiW deformations on a computer with GPU acceleration, and the present invention can quickly predict the future overall deformation of the BiW by simply inputting the process parameter features of the spot welds.

BRIEF DESCRIPTION OF THE DRAWINGS

In order to make the objectives, technical solutions and beneficial effects of the present invention clearer, the present invention provides the following drawings.

DETAILED DESCRIPTION OF THE EMBODIMENTS

The present invention is described in further detail below in combination with the drawings and specific embodiments in order to enable those skilled in the art to better understand and implement the present invention. The illustrated embodiments should not be construed as a limitation to the present invention.

Figure 1:
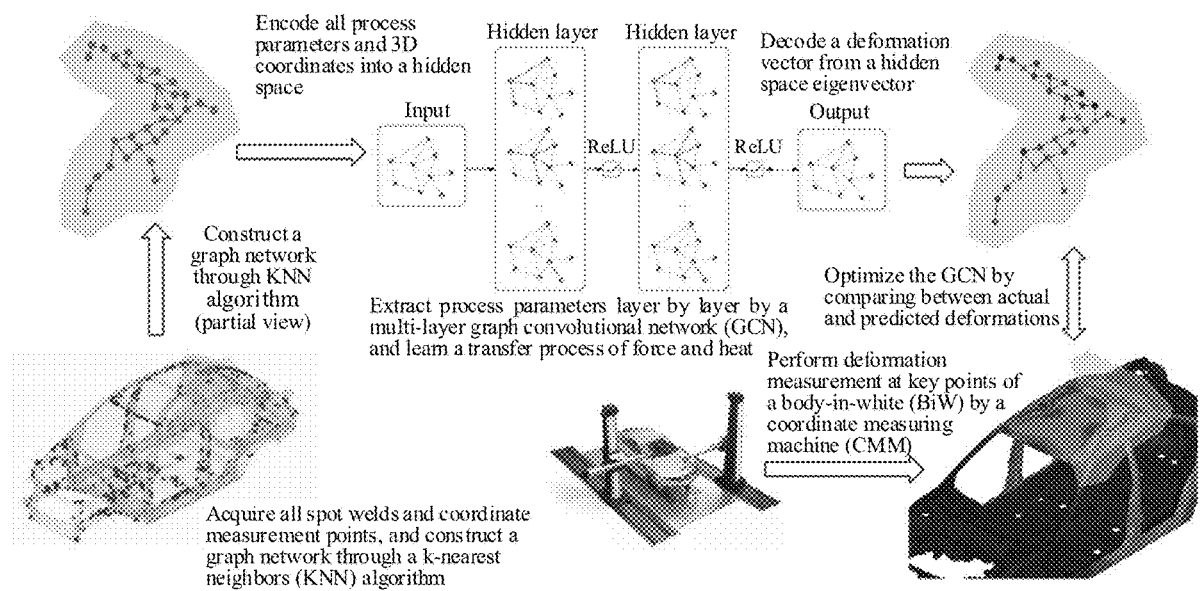
FIG. 1 is a flowchart of a method for constructing a body-in-white (BiW) spot welding deformation prediction model based on a graph convolutional network (GCN) according to the present invention.
Figure 2:
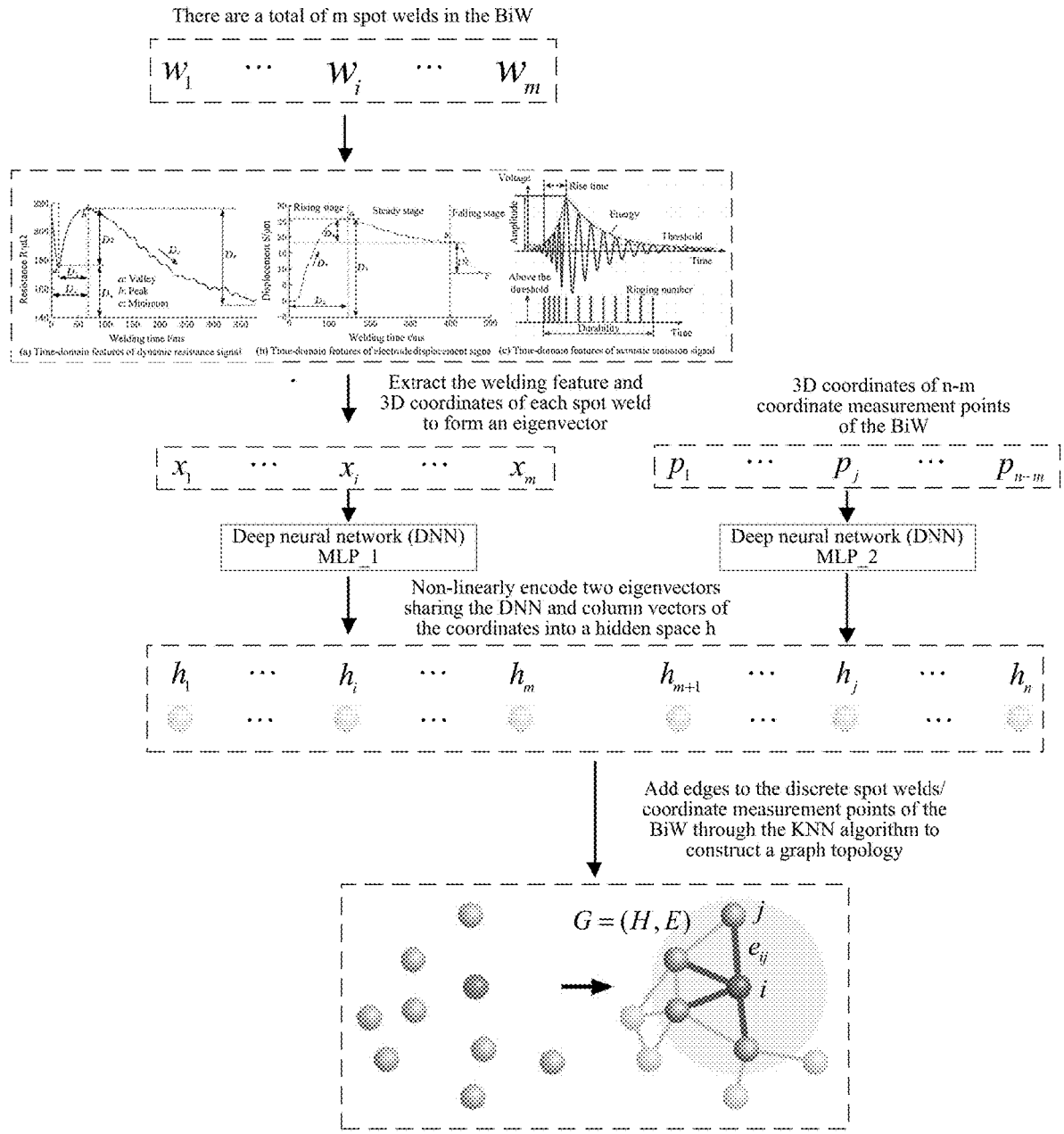
FIG. 2 is a flowchart of constructing a graph topology with node vectors and edges based on process parameters of all spot welds of the BiW and three-dimensional (3D) coordinate parameters of the spot welds and coordinate measurement points.

FIG. 1 is a flowchart of a method for constructing a body-in-white (BiW) spot welding deformation prediction model based on a graph convolutional network (GCN) according to the present invention. The points in FIG. 1 represent all spot welds and coordinate measurement points to measure three-dimensional (3D) coordinates, and they sparsely cover the entire BiW to form a node group. A k-nearest neighbors (KNN) algorithm clusters all the nodes according to their 3D coordinates to acquire a graph topology with nodes and edges. A multi-layer convolution operation acts on the eigenvectors on the graph topology in sequence. The multi-layer convolution operation finally decodes and outputs the deformation of each coordinate measurement node, and compares and optimizes the output deformation of the coordinate measurement node with the deformation of an actual one, such that the model can learn to predict the deformation at each coordinate measurement point of the BiW. Specifically, in this embodiment, the method for constructing a BiW spot welding deformation prediction model based on a GCN includes the following steps:

1) Acquire each spot weld and a three-dimensional (3D) coordinate measurement point thereof of a BiW in a production process; extract a welding feature and 3D coordinates of each spot weld $w_1$ to form an eigenvector $x_i$; and extract designed 3D coordinates at the coordinate measurement point. Specifically, it is assumed that the BiW has a total of m spot welds, and an i-th spot weld is denoted as $w_i$. First, a typical welding feature of each spot weld $w_i$ is extracted, which includes but is not limited to:

a process signal's local peak, local valley, peak moment, valley-to-peak time, rise rate, end value, sag value, and sag rate, where the process signal includes a dynamic resistance, an electrode displacement, and an electrode pressure; and an acoustic emission signal's maximum vibration amplitude, event energy, ringing number, and rise time.

The 3D coordinates of all the spot welds in a physical space of a welding global coordinate system are extracted, and all the extracted welding features and the 3D coordinates form eigenvectors $x_i$ of the spot welds i.

2) Input eigenvectors of all spot welds into a deep neural network (DNN) MLP_1, and encode, by an encoder_1 of the DNN MLP_1, the eigenvectors into hidden space vectors of the spot welds; input designed 3D coordinate vectors of all 3D coordinate measurement points into a DNN MLP_2, and encode, by an encoder_2 of the DNN MLP_2, the designed 3D coordinate vectors into hidden space vectors of the coordinate measurement points; and add edges to the hidden space vectors of the spot welds and the hidden space vectors of the coordinate measurement points through a k-nearest neighbors (KNN) algorithm to construct a graph topology G. The coordinate space where the ideal 3D coordinates of the spot welds and the coordinate measurement points are located is used as a distance measurement space of the KNN algorithm, that is, a spatial linear distance between the spot welds and the coordinate measurement points is used as the clustering basis of the KNN algorithm. The hidden space vector characterizes the thermodynamic and kinetic information implied by each spot weld and can be propagated through the GCN.

This step specifically includes: input the eigenvectors $x_1 \sim x_m$ of all the spot welds into the DNN MLP_1, and encode, by the encoder_1, the eigenvectors into the hidden space vectors $h_1 \sim h_m$ of the spot welds; and input the designed 3D coordinate vectors $p_1 \sim p_{n-m}$ of all the coordinate measurement points into the DNN MLP_2, and encode, by the encoder_2, the designed 3D coordinate vectors into the hidden space vectors $h_{m+1} \sim h_n$ of the coordinate measurement points, where $h_1 \sim h_m$ and $h_{m+1} \sim h_n$ are located in a same vector space to form n discrete vectors $h_1 \sim h_n$; and add, based on a metric space of a global coordinate system where $h_1 \sim h_n$ are located, edges to the vectors $h_1 \sim h_n$ through the KNN algorithm to construct the graph topology G=(H, E), where for an arbitrary i-th node, $h_i \in H$, H being a k-dimensional real vector space $R^k$, that is, $H \subseteq R^k$; and an edge connecting two nodes i and j is $e_{ij} \in E$, where E denotes an edge space of the graph topology G, $E \subseteq \{(x, y) | (x, y) \in H^2\}$, meaning an arbitrary pair of connected nodes in the graph topology.

3) Decompose a Laplacian eigenvector of the constructed graph topology G to acquire frequency domain components, and linearly transform eigenvalues corresponding to the frequency domain components to construct a multi-layer GCN, where each layer of the GCN has a different frequency domain filter to adaptively extract thermodynamic and kinetic information in a neighborhood of each coordinate measurement point of the BiW and simulate a transfer process of the implicit thermodynamic and kinetic information on the whole BiW by the multi-layer GCN.

Figure 3:
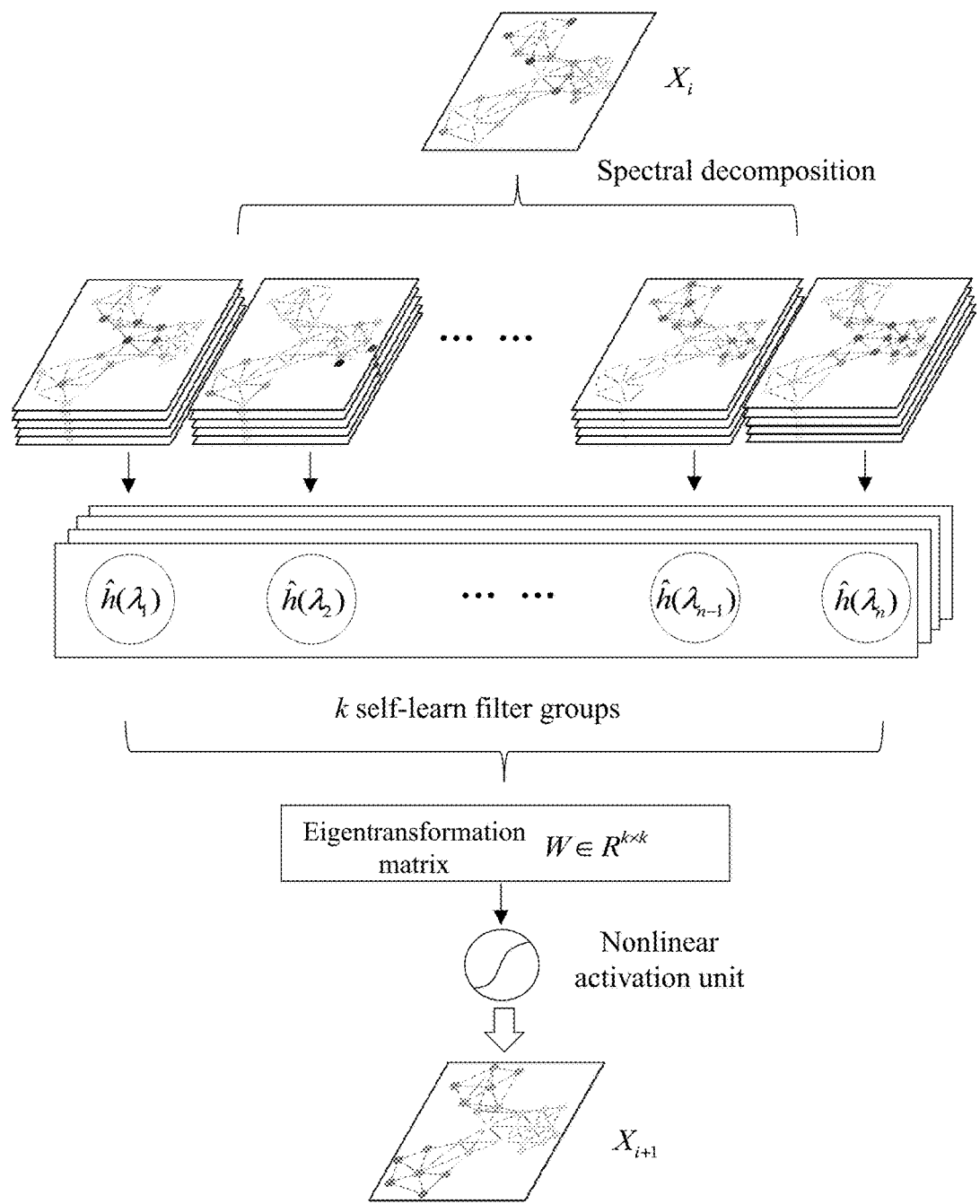
FIG. 3 is a flowchart of decomposing a graph signal of a single graph convolutional layer to realize a convolution operation, where a multi-channel feature fusion of the graph is realized through an eigen transformation matrix, and a nonlinear mapping of the graph convolution is realized through a nonlinear activation function.

Specifically, as shown in FIG. 3, the decomposing a Laplacian eigenvector of the constructed graph topology G includes:

31) Construct an adjacency matrix A of the graph topology G, where the adjacency matrix A is a 0-1 square matrix of n×n, and an element of the square matrix expresses whether two nodes are adjacent; if the two nodes i, j are adjacent, then $a_{ij}=1$; otherwise, $a_{ij}=0$; and $a_{ij}$ is an element of the adjacency matrix, that is, $a_{ij} \in A$.

32) Construct a symmetric normalized Laplacian matrix $L^{sys}$ of the graph topology G:

$$L^{sys}=D^{-1/2}LD^{-1/2}$$

where, D denotes a degree matrix of the graph topology G; and L denotes the Laplace matrix of the graph topology G.

$$L=D-A$$

33) Subject the symmetric normalized Laplacian matrix $L^{sys}$ of the graph topology G to eigendecomposition (spectral decomposition):

$$L^{sys} = U \begin{pmatrix} \lambda_1 & & \\ & \ddots & \\ & & \lambda_n \end{pmatrix} U^{-1}$$

where, $U=(\vec{u}_1, \vec{u}_2, \cdots, \vec{u}_n)$; $\vec{u}_l$ denotes a column vector, which belongs to the vector space H, that is, $\vec{u}_l \in R^k$, $l=1, 2, \cdots, n$; and $$\Lambda = \begin{pmatrix} \lambda_1 & & \\ & \ddots & \\ & & \lambda_n \end{pmatrix}$$

denotes an eigenvalue matrix of the symmetric normalized Laplacian matrix $L^{sys}$; and $\lambda_1 \sim \lambda_n$ denote eigenvalues of the symmetric normalized Laplacian matrix $L^{sys}$ of the graph topology G.

Further, a method for constructing a graph convolutional layer based on the graph topology G includes: subject the symmetric normalized Laplacian matrix of the graph topology G to eigendecomposition to acquire the eigenvectors $\vec{u}_1$, $\vec{u}_2, \ldots \vec{u}_n$; and set an i-th graph convolutional layer with an input feature $X_i$ and an output feature $X_{i+1}$, where $X \in R^{n \times k}$; $R^{n \times k}$ denotes a n×k-dimensional real matrix space n denotes a number of graph nodes; and k denotes a dimension of the hidden space vector.

34) Design a set of filter parameters $g_\theta(\Lambda)$ for each channel of the input feature, which is a k-channel graph topology and convolve each channel of the k-channel graph topology to acquire an eigenmatrix:

$$g_\theta(\Lambda) = \begin{pmatrix} \hat{h}(\lambda_1) & & \\ & \ddots & \\ & & \hat{h}(\lambda_n) \end{pmatrix}$$

where, $\hat{h}(\lambda_1) \sim \hat{h}(\lambda_n)$ denote parameters of a graph filter; and $\vec{h}(\lambda_i)$ denotes a nonlinear function of $\lambda_i$, $i=\{1, 2, \ldots n\}$. Since $\lambda_i$ is an invariant value for a fixed graph, $\hat{h}(\lambda_i)$ is not represented as a function but is represented as an arbitrary real number that is not fixed. In this way, the model can learn the optimal $\hat{h}(\lambda_i)$ during the optimization process.

35) Linearly transform each channel in the eigenmatrix acquired by convolution to acquire an eigen transformation matrix $W \in R^{k \times k}$, and acquire an output data $X_{i+1}$ through an element-level nonlinear activation function ReLu:

$$X_{i+1} = ReLu\left( U \begin{pmatrix} \hat{h}(\lambda_1) & & \\ & \ddots & \\ & & \hat{h}(\lambda_n) \end{pmatrix} U^{-1} X_i \right)$$

where, $R^{k \times k}$ denotes a k×k-dimensional real matrix space.

The eigenvectors $\vec{u}_1, \vec{u}_2, \cdots, \vec{u}_n$ are equivalent to a basis function of a graph signal after decomposition in the frequency domain. In order to realize the time domain convolution operation of the graph signal, the eigenvectors $\vec{u}_i$ are multiplied by corresponding filtered eigenvalues $\hat{h}(\lambda_i)$, and all the eigenvectors acquired by the multiplication operation are superimposed to form a new graph signal, thereby realizing the convolution process of the graph signal, as shown in FIG. 3.

Figure 4:
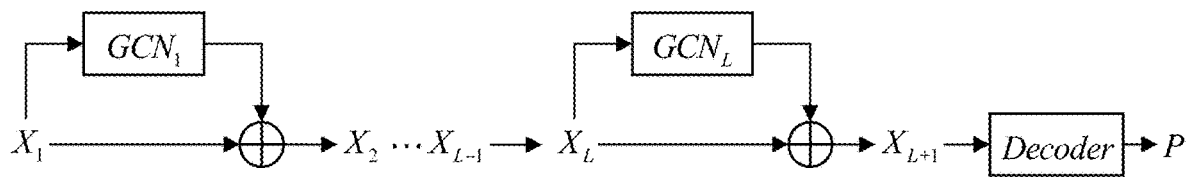
FIG. 4 shows is a flowchart of constructing a single graph convolutional layer into a multi-layer deep residual graph convolutional network (DRGCN) with a residual, where a final residual decodes a final predicted value of a deformation of the BiW by a decoder.

Further, the extracting thermodynamic and kinetic information in a neighborhood of each coordinate measurement point of the BiW includes:

36) Connect the constructed graph convolutional layer by a residual into a deep residual graph convolutional network (DRGCN), where the DRGCN includes L basic residuals (FIG. 4), each of which forms the GCN by the graph convolutional layer; and output, by an L-th basic residual of the DRGCN, final thermodynamic and kinetic information on all the spot welds and coordinate measurement points of the BiW. GCN denotes the graph convolutional network, and $GCN_1 \sim GCN_L$ denote the graph convolutional networks in the residuals 1~L.

4) Input the thermodynamic and kinetic information of each coordinate measurement point into a DNN MLP_3; encode, by an encoder of the DNN MLP_3, the thermodynamic and kinetic information into a 3D coordinate space; and decode a final deformation at each coordinate measurement point; and output a predicted 3D vector of the deformation at each coordinate measurement point.

5) Optimize the BiW spot welding deformation prediction model. Specifically, in this embodiment, the optimizing the BiW spot welding deformation prediction model includes: process, by a L2-norm loss function, actual and predicted 3D vectors of the deformation at each coordinate measurement point; and optimize, by an adaptive movement estimation algorithm (Adam), L2-norm Loss_Avg of each coordinate measurement point as an optimization target for multiple times to acquire the BiW spot welding deformation prediction model based on the GCN.

In the present invention, the GCN is effectively optimized, such that it can learn the thermodynamic and kinetic representation and propagation mode implied by the process parameter features of the spot welds on the BiW and can realize rapid prediction of BiW deformations on a computer with GPU acceleration. The present invention can quickly predict the future overall deformation of the BiW by simply inputting the process parameter features of the spot welds.

The above described are only preferred embodiments illustrated for fully explaining the present invention, and the claimed scope of the present invention is not limited thereto. Equivalent substitutions or transformations made by those skilled in the art on the basis of the present invention are both within the claimed scope of the present invention. The claimed scope of the present invention shall be determined by the claims.

What is claimed is:

1. A method for constructing a body-in-white (BiW) spot welding deformation prediction model based on a graph convolutional network (GCN), comprising the following steps:

1) acquiring each spot weld and a three-dimensional (3D) coordinate measurement point thereof of a BiW in a production process; extracting a welding feature and 3D coordinates of each spot weld $w_i$ to form an eigenvector $x_i$; and extracting designed 3D coordinates at the 3D coordinate measurement point;

wherein $w_i$ denotes an i-th spot weld, and $x_i$ denotes the eigenvector formed by the welding feature and the 3D coordinates of the spot weld $w_i$;

2) inputting eigenvectors of all spot welds into a deep neural network (DNN) MLP_1, and encoding, by an encoder encoder_1 of the DNN MLP_1, the eigenvectors into hidden space vectors of the spot welds; inputting designed 3D coordinate vectors of all 3D coordinate measurement points into a DNN MLP_2, and encoding, by an encoder encoder_2 of the DNN MLP_2, the designed 3D coordinate vectors into hidden space vectors of the coordinate measurement points; and adding edges to the hidden space vectors of the spot welds and the hidden space vectors of the coordinate measurement points through a k-nearest neighbors (KNN) algorithm to construct a graph topology G;

3) decomposing a Laplacian eigenvector of the constructed graph topology G to acquire frequency domain components, and linearly transforming eigenvalues corresponding to the frequency domain components to construct a multi-layer GCN, wherein each layer of the GCN has a different frequency domain filter to adaptively extract thermodynamic and kinetic information in a neighborhood of each coordinate measurement point of the BiW;

4) inputting the thermodynamic and kinetic information of each coordinate measurement point into a DNN MLP_3; encoding, by an encoder decoder of the DNN MLP_3, the thermodynamic and kinetic information into a 3D coordinate space, and decoding a final deformation at each coordinate measurement point; and outputting a predicted 3D vector of the deformation at each coordinate measurement point; and 5) optimizing the BiW spot welding deformation prediction model;

wherein step 2) specifically comprises: inputting the eigenvectors $x_1 \sim x_m$ of all the spot welds into the DNN MLP_1, and encoding, by the encoder encoder_1, the eigenvectors into the hidden space vectors $h_1 \sim h_m$ of the spot welds; and inputting the designed 3D coordinate vectors $p_1 \sim p_{n-m}$ of all the coordinate measurement points into the DNN MLP_2, and encoding, by the encoder encoder_2, the designed 3D coordinate vectors into the hidden space vectors $h_{m+1} \sim h_n$ of the coordinate measurement points, wherein $h_1 \sim h_m$ and $h_{m+1} \sim h_n$ are located in a same vector space to form n discrete vectors $h_1 \sim h_n$; and adding, based on a metric space of a global coordinate system where $h_1 \sim h_n$ are located, edges to the nodes $h_1 \sim h_n$ through the KNN algorithm to construct the graph topology G=(H, E), wherein for an arbitrary i-th node, $h_i \in H$, H being a k-dimensional real vector space $R^k$, that is, $H \subseteq R^k$; and an edge connecting two nodes i and j is $e_{ij} \in E$, wherein E denotes an edge space of the graph topology G, $E \subseteq \{(x, y) | (x, y) \in H^2\}$, meaning an arbitrary pair of connected nodes in the graph topology;

$h_i$ denotes a discrete vector of an i-th node; i and j denote nodes; m denotes a number of spot welds; n denotes a number of discrete vectors;

wherein in step 3), the decomposing a Laplacian eigenvector of the constructed graph topology G comprises:

31) constructing an adjacency matrix A of the graph topology G, wherein the adjacency matrix A is a 0-1 square matrix of n×n, and an element of the square matrix expresses whether two nodes are adjacent; if the two nodes i, j are adjacent, then $a_{ij}=1$; otherwise, $a_{ij}=0$; and $a_{ij}$ is an element of the adjacency matrix, that is, $a_{ij} \in A$;

32) constructing a symmetric normalized Laplacian matrix $L^{sys}$ of the graph topology G:

$$L^{sys} = D^{-1/2} L D^{-1/2}$$

wherein, D denotes a degree matrix of the graph topology G; and L denotes the Laplace matrix of the graph topology G, which is calculated from the adjacency matrix:

$$L = D - A$$

33) subjecting the symmetric normalized Laplacian matrix $L^{sys}$ of the graph topology G to eigendecomposition (spectral decomposition):

$$L^{sys} = U \begin{pmatrix} \lambda_1 & & \\ & \ddots & \\ & & \lambda_n \end{pmatrix} U^{-1}$$

wherein, $U = (\vec{u}_1, \vec{u}_2, \cdots, \vec{u}_n)$; $\vec{u}_l$ denotes a column vector, which belongs to the vector space H, that is, $\vec{u}_l \in R^k$, $l=1, 2, \cdots, n$; and $$\Lambda = \begin{pmatrix} \lambda_1 & & \\ & \ddots & \\ & & \lambda_n \end{pmatrix}$$

denotes an eigenvalue matrix of the symmetric normalized Laplacian matrix $L^{sys}$; and $\lambda_1 \sim \lambda_n$ denote eigenvalues of the symmetric normalized Laplacian matrix $L^{sys}$ of the graph topology G;

wherein a method for constructing a graph convolutional layer based on the graph topology G comprises: setting an i-th graph convolutional layer with an input feature $X_i$ and an output feature $X_{i+1}$, wherein $X \in R^{n \times k}$; $R^{n \times k}$ denotes a n×k-dimensional real matrix space; n denotes a number of graph nodes; and k denotes a dimension of the hidden space vector;

34) designing a set of filter parameters $g_\theta(\Lambda)$ for each channel of the input feature, which is a k-channel graph topology, and convolving each channel of the k-channel graph topology to acquire an eigenmatrix $\tilde{X}_i$:

$$g_\theta(\Lambda) = \begin{pmatrix} \hat{h}(\lambda_1) & & \\ & \ddots & \\ & & \hat{h}(\lambda_n) \end{pmatrix}$$

wherein, $\hat{h}(\lambda_1) \sim \hat{h}(\lambda_n)$ denote parameters of a graph filter; and $\hat{h}(\lambda_i)$ denotes a nonlinear function of $\lambda_i$, $i = \{1, 2, \ldots, n\}$; and 35) linearly transforming each channel in the eigenmatrix acquired by convolution to acquire an eigen transformation matrix $W \in R^{k \times k}$, and acquiring an output data $X_{i+1}$ through an element-level nonlinear activation function ReLu:

$$X_{i+1} = \text{Relu}\left(U\begin{pmatrix} \hat{h}(\lambda_1) & & \\ & \ddots & \\ & & \hat{h}(\lambda_n) \end{pmatrix} U^{-1} X_i\right)$$

wherein, $R^{k \times k}$ denotes a k×k-dimensional real matrix space;

wherein in step 3), the extracting thermodynamic and kinetic information in a neighborhood of each coordinate measurement point of the BiW comprises:

36) connecting the constructed graph convolutional layer by a residual into a deep residual graph convolutional network (DRGCN), wherein the DRGCN comprises L basic residuals, each of which forms the GCN by the graph convolutional layer; and, outputting, by an L-th basic residual of the DRGCN, final thermodynamic and kinetic information on all the spot welds and coordinate measurement points of the BiW;

wherein in step 5), the optimizing the BiW spot welding deformation prediction model comprises: processing, by a L2-norm loss function, actual and predicted 3D vectors of the deformation at each coordinate measurement point; and optimizing, by an adaptive movement estimation algorithm (Adam), L2-norm Loss_Avg of each coordinate measurement point as an optimization target to acquire the BiW spot welding deformation prediction model based on the GCN.

2. The method for constructing the BiW spot welding deformation prediction model based on the GCN according to claim 1, wherein in step 1), the welding feature comprises:
   a process signal's local peak, local valley, peak moment, valley-to-peak time, rise rate, end value, sag value, and sag rate, wherein the process signal comprises a dynamic resistance, an electrode displacement, and an electrode pressure; and
   an acoustic emission signal's maximum vibration amplitude, event energy, ringing number, and rise time.

\* \* \* \* \*